US010351227B2

(12) United States Patent
Ditzler

(10) Patent No.: US 10,351,227 B2
(45) Date of Patent: Jul. 16, 2019

(54) ELECTRICALLY POWERED DOWNLOCK ACTUATION SYSTEM

(71) Applicant: Goodrich Corporation, Charlotte, NC (US)

(72) Inventor: Adam J. Ditzler, Fort Worth, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 378 days.

(21) Appl. No.: 15/224,161

(22) Filed: Jul. 29, 2016

(65) Prior Publication Data

US 2018/0029698 A1    Feb. 1, 2018

(51) Int. Cl.
| | | |
|---|---|---|
| B64C 25/24 | (2006.01) | |
| B64C 25/26 | (2006.01) | |
| F16H 21/06 | (2006.01) | |
| F16H 21/44 | (2006.01) | |

(52) U.S. Cl.
CPC .............. *B64C 25/26* (2013.01); *B64C 25/24* (2013.01); *F16H 21/06* (2013.01); *F16H 21/44* (2013.01)

(58) Field of Classification Search
CPC ......... B64C 25/24; B64C 25/26; F16H 21/06; F16H 21/44
See application file for complete search history.

(56) References Cited

U.S. PATENT DOCUMENTS

| | | | | |
|---|---|---|---|---|
| 1,903,039 | A | * | 3/1933 | Gianoli ................... F16H 21/06 119/341 |
| 2,507,962 | A | | 5/1950 | Clark et al. |
| 2,668,030 | A | | 2/1954 | Smith et al. |
| 2,896,884 | A | | 7/1959 | Perdue |
| 5,269,481 | A | | 12/1993 | Derrien |
| 8,292,219 | B2 | | 10/2012 | Collins |
| 8,590,835 | B2 | | 11/2013 | Ditzler |
| 8,602,352 | B2 | | 12/2013 | Keller |
| 8,991,753 | B2 | | 3/2015 | Mellor et al. |

(Continued)

FOREIGN PATENT DOCUMENTS

| | | |
|---|---|---|
| EP | 2386487 A2 | 11/2011 |
| GB | 2501906 A | 11/2013 |
| WO | 2015040364 | 3/2015 |

OTHER PUBLICATIONS

Extended European Search Report dated Dec. 15, 2017 in European Application No. 17175842.8.

*Primary Examiner* — Nicholas McFall
(74) *Attorney, Agent, or Firm* — Snell & Wilmer, L.L.P.

(57) ABSTRACT

A locking linkage system may comprise a lockable assembly comprising an upper brace, a lower brace coupled to the upper brace, and a linkage coupled to the upper brace and the lower brace. The locking linkage system may further comprise a downlock actuator comprising an electric motor coupled to the upper brace, a rotary output shaft coupled to the electric motor, a connecting output coupled to the rotary output shaft, wherein the connecting output shaft is configured to rotate between a fixed locked position and a fixed unlocked position, and a link rod having a distal end coupled to the linkage and a proximal end comprising a lost-motion joint, the lost-motion joint being coupled to a connection pin of connecting output shaft. The downlock actuator may be configured to toggle the linkage, the upper brace, and the lower brace between an unlocked position and a locked position.

15 Claims, 6 Drawing Sheets

(56) References Cited

U.S. PATENT DOCUMENTS

| | | |
|---|---|---|
| 9,227,724 B2 | 1/2016 | Schmidt |
| 2006/0163426 A1 | 7/2006 | Smith |
| 2011/0163202 A1 | 7/2011 | Martinez |
| 2011/0278394 A1* | 11/2011 | Ditzler .................... B64C 25/26 |
| | | 244/102 SL |
| 2013/0119197 A1 | 5/2013 | Ducos |
| 2015/0314861 A1 | 11/2015 | Paddock et al. |

* cited by examiner

US 10,351,227 B2

ELECTRICALLY POWERED DOWNLOCK ACTUATION SYSTEM

FIELD

This disclosure relates to an electrically powered downlock actuation system attachable to a landing gear brace, and more specifically to an electrically-powered downlock actuation system that uses the rotary output of an electric motor to directly drive a landing gear brace locking mechanism.

BACKGROUND

Landing gear assemblies are configured to retract the landing gear of an aircraft after takeoff and deploy the landing gear before landing. Landing gear assemblies may include locking linkage systems, for example those comprising a downlock actuator, configured to actuate the locking and unlocking of the landing gear. When in an unlocked position, during landing gear retraction or extension, components within the downlock actuator may translate longitudinally in response to movement within the locking linkage system or landing gear assembly as a whole.

SUMMARY

In various embodiments, a locking linkage system of a landing gear assembly may comprise a lockable assembly comprising an upper brace defining a longitudinal axis, a lower brace coupled to the upper brace, and a linkage coupled to the upper brace and the lower brace. The linkage may be configured to allow movement of the upper brace and the lower brace relative to one another between unlocked and locked positions. The locking linkage system may further comprise a downlock actuator comprising an electric motor coupled to the upper brace; a rotary output shaft coupled to the electric motor; a connecting output shaft having a first shaft end and a second shaft end, the first shaft end being coupled to the rotary output shaft, wherein the connecting output shaft is configured to rotate between a fixed locked position and a fixed unlocked position; and a link rod having a distal end coupled to the linkage and a proximal end comprising a lost-motion joint, the lost-motion joint being coupled to a connection pin of the second shaft end of the connecting output shaft, wherein the downlock actuator is configured to toggle the linkage, the upper brace, and the lower brace between an unlocked position and a locked position.

In various embodiments, the lost-motion joint may comprise a joint void defined by a void rim, wherein the connection pin is disposed within the joint void, wherein the joint void has a void length that is longer than a pin thickness of the connection pin such that the connection pin may translate within the joint void and the connection pin may only contact one of a first end and a second end of the joint void at a time. In various embodiments, the connection pin may be in contact with the first end of the joint void in response to the connecting output shaft being in the fixed locked position. In various embodiments, connection pin may be in a floating position in the joint void in response to the connecting output shaft being in the fixed unlocked position, the floating position being a pin position in which the connection pin is physically separated from the first end and the second end of the joint void.

In various embodiments, the linkage may comprise an upper lock link pivotally coupled to a lower lock link, wherein the upper lock link is coupled to the upper brace and the lower lock link is coupled to the lower brace. In various embodiments, the locking linkage system may further comprise an output shaft position sensor proximate the connecting output shaft, wherein the output shaft position sensor is configured to detect a shaft position of the connecting output shaft. In various embodiments, the locking linkage system may further comprise a joint position sensor, proximate the lost-motion joint, configured to detect a pin position of the connection pin along the void length. In various embodiments, the locking linkage system may further comprise a gearbox to provide a desired amount of speed change between the electric motor and the connecting output shaft, wherein the gearbox is fixedly coupled to the electric motor, the rotary output shaft is fixedly coupled to the gearbox, and the connecting output shaft is fixedly coupled to the rotary output shaft.

In various embodiments, a downlock actuator for a landing gear system may comprise an electric motor; a rotary output shaft coupled to the electric motor; a connecting output shaft having a first shaft end and a second shaft end, the first shaft end being coupled to the rotary output shaft, wherein the connecting output shaft is configured to rotate between a fixed locked position and a fixed unlocked position; and a link rod having a proximal end comprising a lost-motion joint, the lost-motion joint being coupled to a connection pin of the second shaft end of the connecting output shaft.

In various embodiments, the lost-motion joint may comprise a joint void defined by a void rim, wherein the joint void has a void length that is longer than a pin thickness of the connection pin such that the connection pin may translate within the joint void and the connection pin may only contact one of a first end and a second end of the joint void at a time. In various embodiments, the link rod further comprises a distal end coupled to a lockable assembly, which includes a linkage, an upper brace, and a lower brace, and wherein, the connecting output shaft and the link rod are configured to toggle the linkage, the upper brace, and the lower brace between an unlocked position and a locked position.

In various embodiments, the downlock actuator may further comprise an output shaft position sensor proximate to the connecting output shaft configured to detect a shaft position of the connecting output shaft. In various embodiments, the downlock actuator may further comprise a joint position sensor, proximate the lost-motion joint, configured to detect a pin position of the connection pin along the void length.

In various embodiments, the connection pin may be in contact with the first end of the joint void in response to the connecting output shaft being in the fixed locked position. In various embodiments, the connection pin may be in a floating position in the joint void in response to the connecting output shaft being in the fixed unlocked position, the floating position being a pin position in which the connection pin is physically separated from the first end and the second end of the joint void.

In various embodiments, a method of positioning an upper brace and a lower brace of an aircraft landing gear system in a desired relationship with one another may comprise rotating an electric motor in a desired rotational direction, rotating a rotary output shaft coupled to the electric motor, and rotating a connecting output shaft between a fixed locked position and a fixed unlocked position in response to the rotating the rotary output shaft, a first shaft end of the connecting output shaft being coupled to the rotary output shaft. In various embodiments, rotating the connecting output shaft may comprise translating a connection pin, coupled to the connecting output shaft, between a first end of a joint void in a lost-motion joint and a second end of the joint void, wherein the lost-motion joint is coupled to a proximal end of a link rod, wherein the connecting output shaft rotates independently of the link rod throughout the translating the connection pin between the first end and the second end of the joint void.

In various embodiments, the method may further comprise translating the link rod in a first longitudinal direction in response to the connecting output shaft rotating toward the fixed unlocked position, wherein, in response to the connecting output shaft reaching the fixed unlocked position, the connection pin reaches a floating position in the joint void, the floating position being a pin position in which the connection pin is physically separated from the first end and the second end of the joint void. In various embodiments, the method may further comprise translating the link rod in a second longitudinal direction in response to the connecting output shaft rotating toward the fixed locked position. In various embodiments, the method may further comprise detecting a shaft position of the connecting output shaft with an output shaft position sensor located proximate the connecting output shaft. In various embodiments, rotating the connecting output shaft may comprise at least one of rotating the connecting output shaft from the fixed locked position, and stopping at the fixed unlocked position in response to the output shaft position sensor detecting the connecting output shaft arriving at the fixed unlocked position, or rotating the connecting output shaft from the fixed unlocked position, and stopping at the fixed locked position in response to the output shaft position sensor detecting the connecting output shaft arriving at the fixed locked position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. In the figures, like referenced numerals may refer to like parts throughout the different figures unless otherwise specified.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

This disclosure generally relates to an electrically powered downlock actuation system, or downlock actuator, for landing gear braces, such as the braces in a locking linkage system making up a landing gear drag brace or side brace. Electrically actuated downlock actuators present a different set of challenges relative to hydraulically powered downlock actuators. For example, the electrical actuation components should fit substantially within the same space constraints or spatial envelope, not substantially increase the weight of the overall downlock actuation system, and minimize force inefficiencies in the overall landing gear design. Generally, electrically powered linear actuators may lose efficiency in converting rotary motor output into linear motion. In various embodiments, a locking linkage system includes a downlock actuator, which may be electrically-powered, for a landing gear system that does not convert rotary motor output into linear motion during the actuation process, but instead uses the rotary motor output to directly drive a locking mechanism coupled to a landing gear brace. The locking linkage system substantially fits within the same space constraints as hydraulically powered downlock actuators and achieves adequate reliability and maintainability ratings.

Figure 1A:
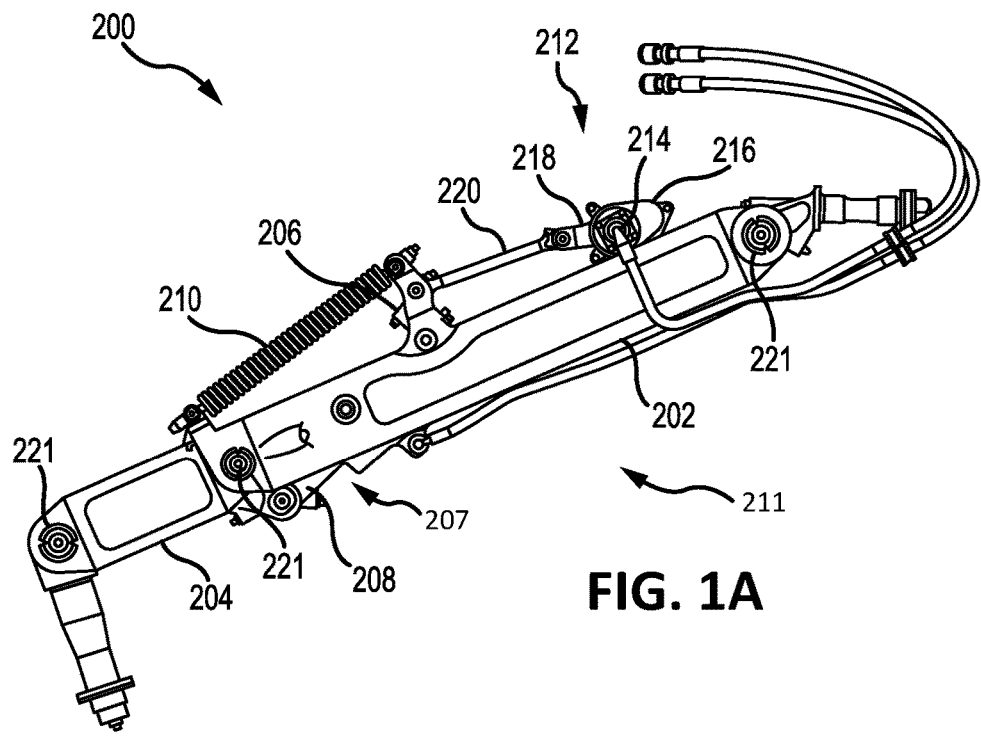
FIG. 1A illustrates a side view of a locking linkage system for a landing gear system, in accordance with various embodiments.
Figure 1B:
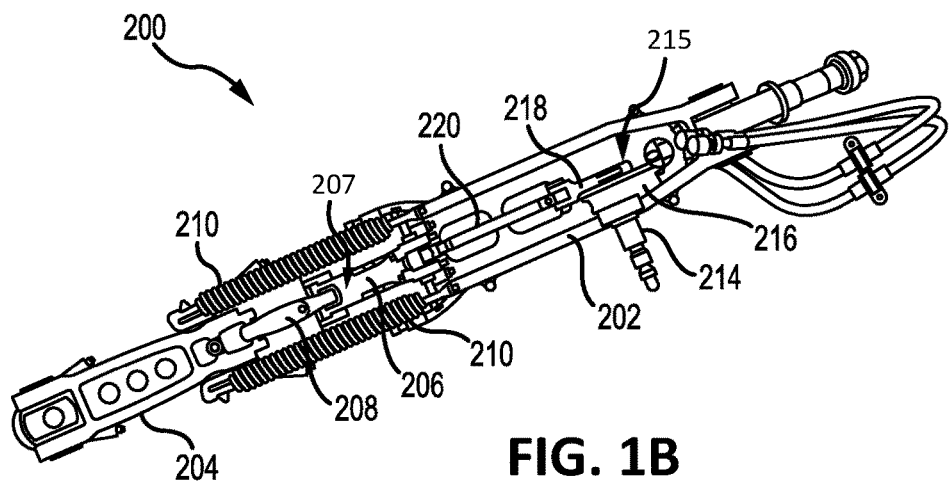
FIG. 1B illustrates a top view of a locking linkage system for a landing gear system, in accordance with various embodiments.

FIGS. 1A and 1B show locking linkage system 200, which is part of a landing gear assembly, comprising a lockable assembly 211. Lockable assembly 211 may comprise an upper brace 202, a lower brace 204, and a linkage coupled between upper brace 202 and lower brace 204. In various embodiments, locking linkage system 200 operates upper brace 202 relative to lower brace 204, such as by moving (e.g., rotating) lower brace 204 relative to upper brace 202. Locking linkage system 200 comprises coupling pins 221 which couple the various components of locking linkage system 200 together. Braces 202, 204 are coupled together via the linkage which comprises upper and lower lock links 206, 208, respectively. Upper lock link 206 is pivotally coupled to lower lock link 208. Lock springs 210 are coupled to upper brace 202 and upper lock link 206, although there are many other ways that lock springs 210 may be attached, and lock springs 210 may be attached to locking linkage system 200 at points other than upper brace 202 and upper lock link 206. Lock springs 210 may take the form of extension springs that provide a tensile force to pull upper lock link 206 into a locked position, but other types of springs may be used.

In various embodiments, locking linkage system 200 may comprise a downlock actuator 212, which is electrically powered, that may replace or be initially installed in lieu of a conventional hydraulic downlock actuator. Downlock actuator 212 may comprise an electric motor 214, a gearbox 216, a connecting output shaft 218 (coupled to, and extending from, electric motor 214 and/or gearbox 216), and a link rod 220, which may take the form of a fixed-length link rod. Downlock actuator 212 may take the form of an electric rotary mechanism with no linear motion output, but instead provides rotary output via a rotary output shaft 215, which drives connecting output shaft 218, connecting output shaft 218 being coupled to rotary output shaft 215. In various embodiments, rotary output shaft 215 may be coupled to electric motor 214 and/or gearbox 216. Electric motor 214 and/or gearbox 216 may be rigidly coupled to upper brace 202. Electrical power cords are arranged to supply electrical power to electric motor 214. Downlock actuator 212 may be configured to toggle the linkage, upper brace 202, and lower brace 204 between an unlocked position and a locked position. As depicted in FIG. 1A, the linkage is positioned in locked link position 207.

In various embodiments, electric motor 214 may be positioned such that rotary output shaft 215 is substantially perpendicular to the linear direction of motion required. Stated another way, rotary output shaft 215 of electric motor 214 or gearbox 216 may be positioned substantially perpendicular to a longitudinal axis of link rod 220 and/or perpendicular to a plane of motion defined as a plane that is orthogonal to the axes of coupling pins 221. In turn, link rod 220 couples to connecting output shaft 218 at a location displaced from a centerline of rotation of gearbox 216, electric motor 214, or rotary output shaft 215.

Figure 2A:
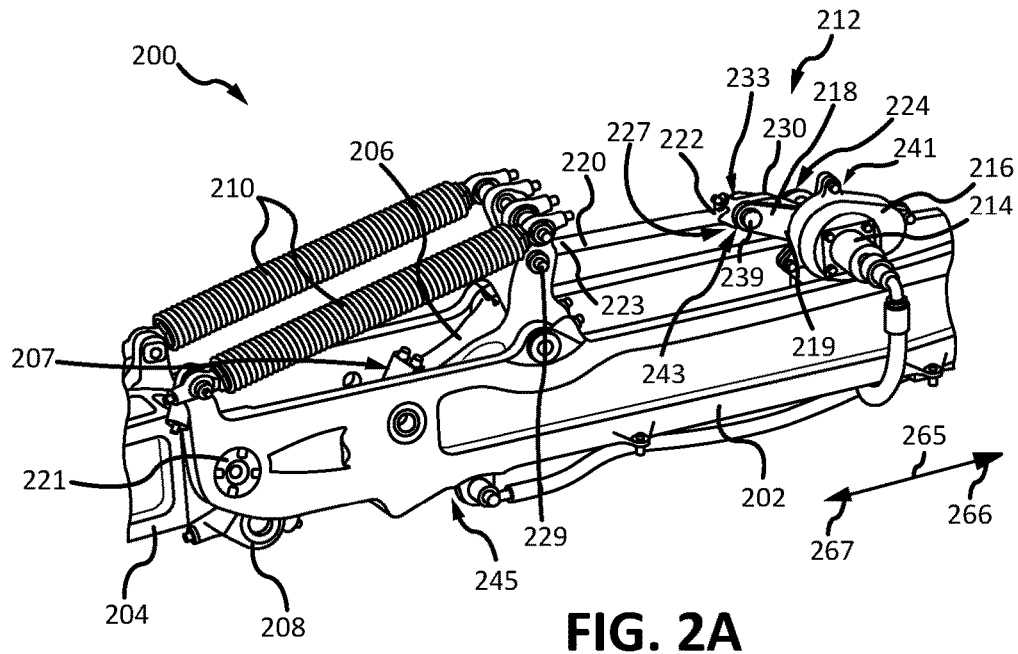
FIG. 2A illustrates a perspective view of a downlock actuator in a fixed locked position, in accordance with various embodiments.
Figure 2B:
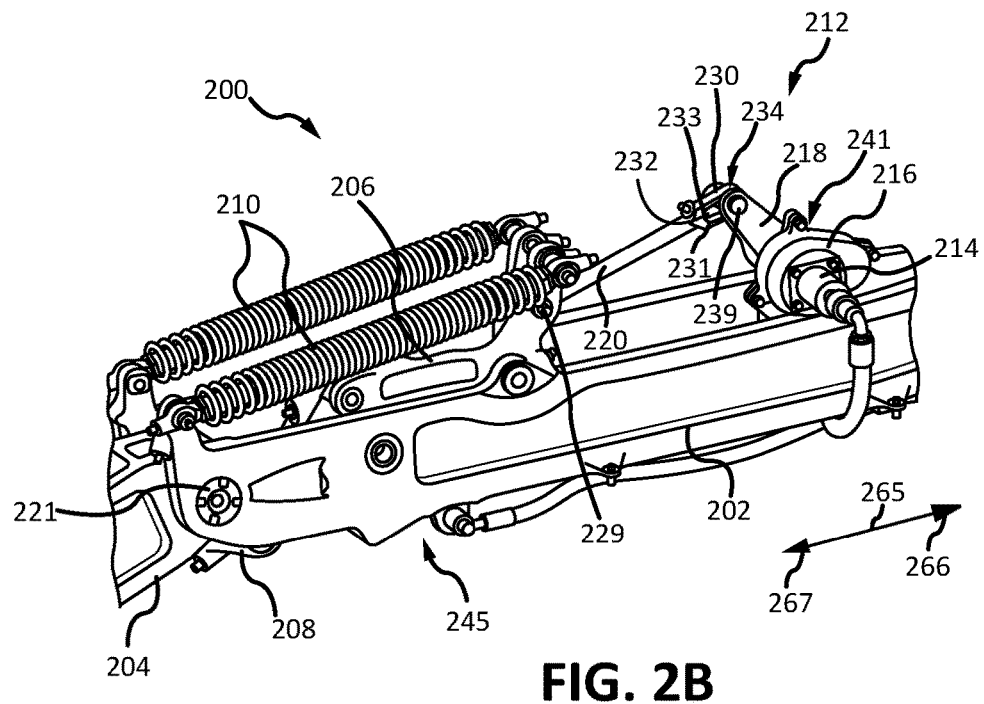
FIG. 2B illustrates a perspective view of a downlock actuator in an intermediate unlocked position, in accordance with various embodiments.

FIGS. 2A and 2B depict perspective views of a downlock actuator 212, in accordance with various embodiments. Elements with the like element numbering between figures are intended to be the same and will not be repeated for the sake of clarity. In various embodiments, a first shaft end 219 of connecting output shaft 218 may be coupled to rotary output shaft 215 (depicted in FIG. 1B) of electric motor 214 and/or gearbox 216. Rotary output shaft 215 may be fixedly coupled to electric motor 214 and/or gearbox 216. A second shaft end of connecting output shaft 218 may comprise a connection pin 239. In various embodiments, connection pin 239 may be anywhere along connecting output shaft 218. A proximal end 222 of link rod 220 may comprise a lost-motion joint 230. In various embodiments, lost-motion joint 230 may be comprised anywhere along link rod 220. Lost-motion joint 230 may comprise a joint void 232 defined by a void rim 231, through which connection pin 239 is disposed, coupling connecting output shaft 218 to link rod 220. A distal end 223 of link rod 220 may be coupled to the linkage, such as upper lock link 206.

In various embodiments, a lost motion joint comprised in a downlock actuator may be disposed in various locations.

In various embodiments, lost-motion joint 230 may be disposed at a coupling point between link rod 220 and connecting output shaft 218. As depicted in FIGS. 2A and 2B, the coupling point may be at proximal end 222 of link rod 220 and connection pin 239. In various embodiments, a lost motion joint may be comprised on connecting output shaft, and link rod 220 may comprise the connection pin disposed in the lost motion joint. In various embodiments, the lost-motion joint may be disposed at a link coupling point 229 between link rod 220 and upper lock link 206, comprised in link rod 220 or upper lock link 206. In various embodiments, in which the lost-motion joint is comprised on link rod 220 at a link coupling point 229 between link rod 220 and upper lock link 206, upper lock link 206 may comprise a connection pin disposed within the lost-motion joint. In various embodiments, in which the lost-motion joint is comprised on upper lock link 206 at a link coupling point 229 between link rod 220 and upper lock link 206, link rod 220 may comprise a connection pin disposed within the lost-motion joint. In various embodiments, the lost motion joint may be comprised on rotary output shaft 215.

With reference to FIGS. 2A, 2B, 3A, 3B, and 4 in various embodiments, joint void 232 comprises a first end 233, a second end 234, and a void length 235 between the first end 233 and the second end 234. Connection pin 239 may have a pin thickness (for example, a pin diameter in the case in which connection pin 239 has a circular cross section). Void length 235 may be longer than the pin thickness of connection pin 239 such that connection pin 239 may translate within joint void 232 along void length 235. In various embodiments, joint void 232 may be designed such that connection pin 239 may not contact first end 233 and second end 234 of joint void 232 simultaneously. Stated another way, connection pin 239 may only contact either first end 233 or second 234 at any given time, or connection pin 239 may be physically separated from both first end 233 and second end 234 at any given time. In various embodiments, locking linkage system 200 and/or downlock actuator 212 may comprise a joint position sensor 243 configured to detect a position of connection pin 239 within joint void 232 along void length 235.

In various embodiments, link rod 220 operates to drive motion in the lock links 206, 208. Link rod 220 may be mounted for longitudinal translation, relative to the longitudinal axis 265 defined by upper brace 202, and rotation, relative to the connecting output shaft 218, whereby proximal end 222 of link rod 220 moves away from upper brace 202 and distal end 223 of link rod 220 moves toward upper brace 202 to unlock braces 202, 204 from the locked position to the unlocked position. Electric motor 214 may include motor control electronics that are programmable to control an angular position of connecting output shaft 218. In various embodiments, the motor control electronics may be programmed using output position feedback detected by an output shaft position sensor 241 coupled to locking linkage system 200 proximate to connecting output shaft 218. In various embodiments, a signal from output shaft position sensor 241 indicating that connecting output shaft 218 has reached a desired position may result in electric motor 214 being shut off to maintain such a position, or electric motor 214 may be commanded to maintain such a position. In response to electric motor being shut off, connecting output shaft 218 may remain in the desired position by friction within electric motor 214 and/or gearbox 216 due to reflected inertia. In various embodiments, electric motor 214 may be configured to receive the position of connecting output shaft 218 from output shaft position sensor 241 and to apply a compensatory torque in the event of movement of the connecting output shaft 218. Such control may be accomplished using a proportional-integral-derivative controller or a proportional-integral controller. In various embodiments, springs coupled to connecting output shaft 218 may be used to hold connecting output shaft 218 in a desired position.

Gearbox 216 may provide a speed reduction between electric motor 214 and connecting output shaft 218 such that operation of electric motor 214 may produce a limited angular range of motion of connecting output shaft 218 between a fixed locked position 224 and a fixed unlocked position 226. The motor control electronics could also be used to provide precise control of a position of connecting output shaft 218 over a desired angular range, which may be the limited angular range between fixed locked position 224 and fixed unlocked position 226.

Fixed locked position 224 is the position of connecting output shaft 218 which causes downlock actuator 212 to lock upper lock link 206 and lower lock link 208, and upper brace 202 and lower brace 204, such that braces 202, 204 are substantially along a longitudinal axis defined by upper brace 202, parallel to longitudinal axis 265, which results in the landing gear of an aircraft being fully extended. Upper lock link 206 and lower lock link 208 are in locked link position 207 (as depicted in FIGS. 1A and 2A) in response to connecting output shaft 218 being in fixed locked position 224. Fixed locked position 224 is the closest position that connecting output shaft 218 may move about electric motor 214 and/or gearbox 216 toward upper brace 202, creating a minimum angle between upper brace 202 and connecting output shaft 218. Connection pin 239 will be against first end 233 of joint void 232 in response to connecting output shaft 218 being in fixed locked position 224.

Figure 3A:
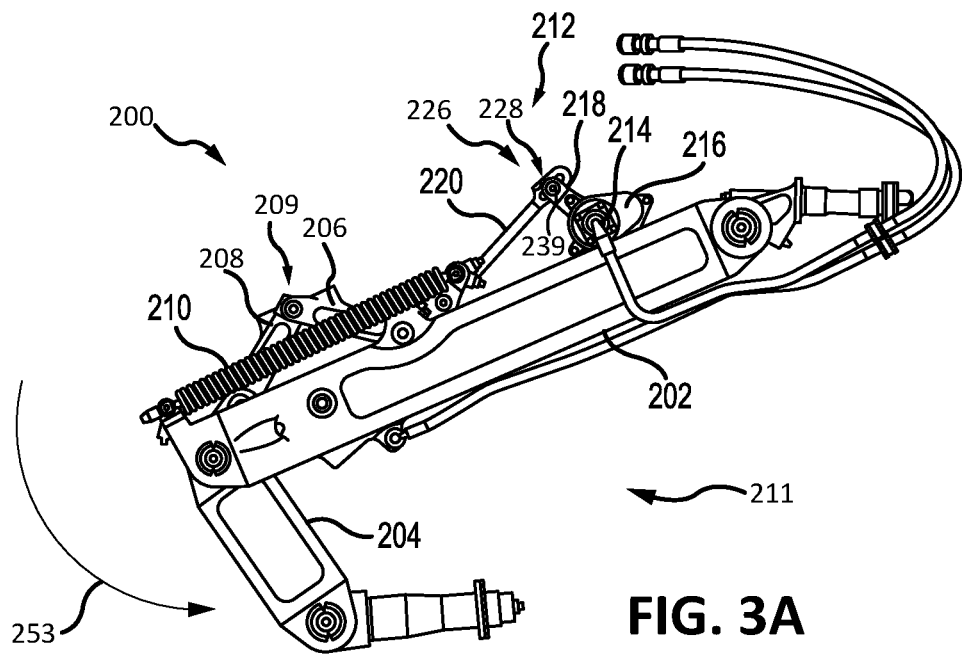
FIG. 3A illustrates a side view of a locking linkage system for a landing gear system in a fixed unlocked position, in accordance with various embodiments.
Figure 3B:
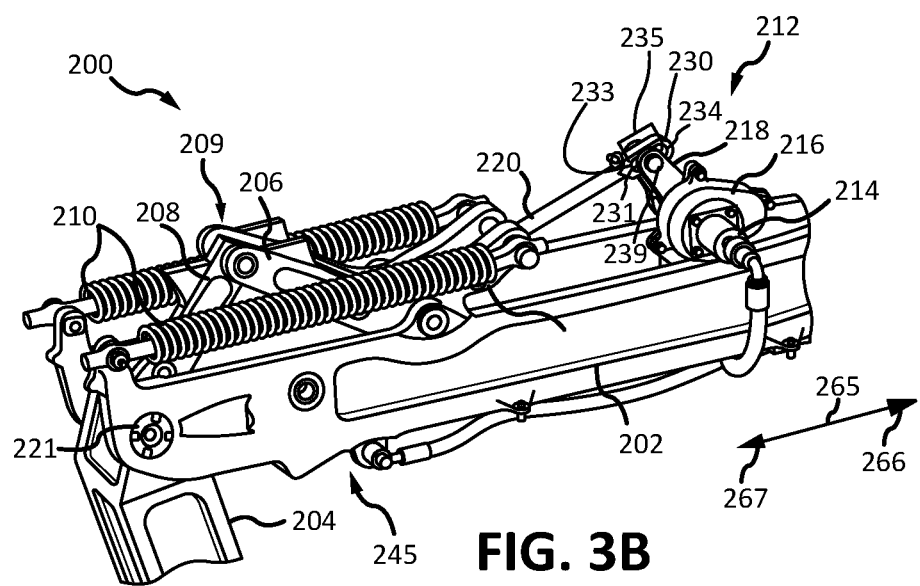
FIG. 3B illustrates a perspective view of a downlock actuator in a fixed unlocked position, in accordance with various embodiments.

Fixed unlocked position 226 is the position of connecting output shaft 218 at which output shaft position sensor 241 detects that lock links 206, 208 are positively unlocked so upper brace 202 and lower brace 204 may move relative to one another to allow retraction of the landing gear, such as lower brace 204 moving in direction 253. Upper lock link 206 and lower lock link 208 are in unlocked link position 209 (as depicted in FIGS. 3A and 3B), or moving toward unlocked link position 209, in response to connecting output shaft 218 being in fixed unlocked position 226. Fixed unlocked position 226 is the furthest position that connecting output shaft 218 may move about electric motor 214 and/or gearbox 216 away from upper brace 202, creating a maximum angle between upper brace 202 and connecting output shaft 218. Any position of connecting output shaft 218 between fixed locked position 224 and fixed unlocked position 226 may be referred to as an intermediate unlocked position. In an intermediate unlocked position, lock links 206, 208 may be in unlocked link position 209 or moving toward unlocked link position 209.

In various embodiments, locking linkage system 200 may comprise a link position sensor 245 disposed proximate to upper lock link 206 and/or lower lock link 208. Link position sensor 245 may be configured to detect the position of the lock links 206, 208, whether they are in locked link position 207 or unlocked link position 209, or somewhere between locked link position 207 and unlocked link position 209, i.e., an intermediate unlocked link position.

Figure 5:
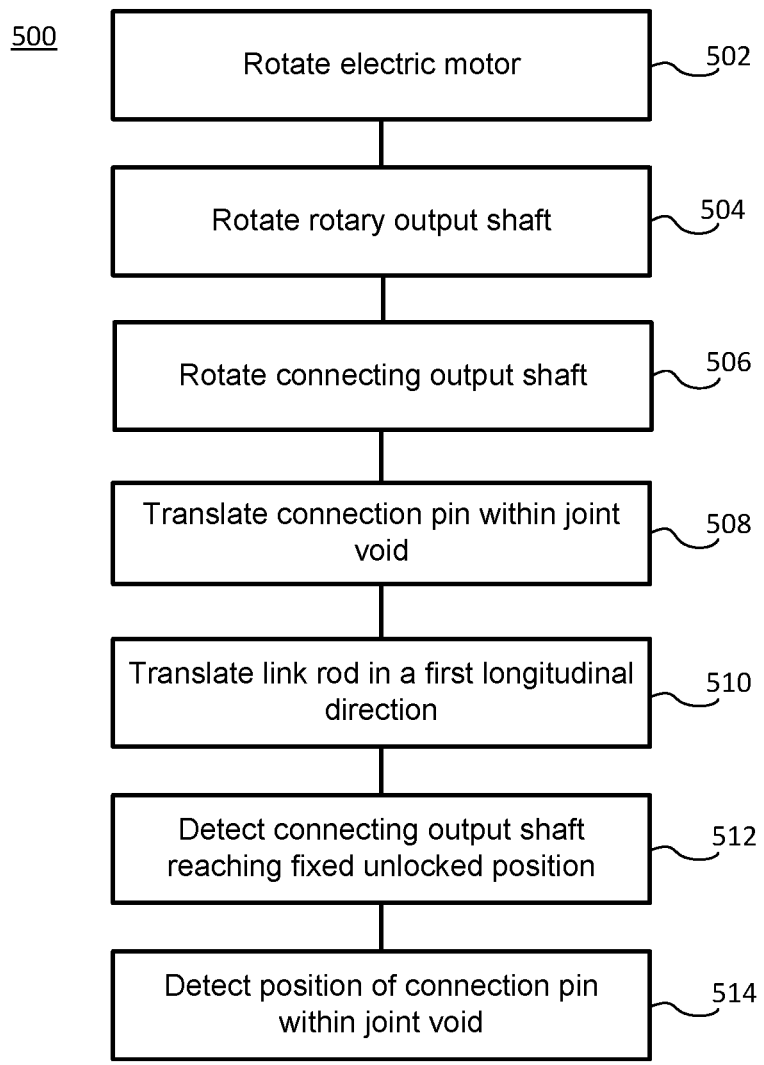
FIG. 5 illustrates a method for unlocking a locking linkage system to allow retraction of landing gear, in accordance with various embodiments.

FIG. 5 depicts a method 500 for unlocking locking linkage system 200 to allow retraction of the landing gear, in accordance with various embodiments. With combined reference to FIGS. 2A, 2B, 3A, 3B, and 5, in operation, locking linkage system 200 may begin method 500 with connecting output shaft 218 in fixed locked position 224 and upper lock link 206 and lower lock link 208 being in locked link position 207. In response to connecting output shaft 218 being in fixed locked position 224, connection pin 239 may be in contact with first end 233 of joint void 232 of lost-motion joint 230, in a resting locked position 227. Electric motor 214 may be rotated (step 502) in response to being powered to rotate. In response to electric motor 214 rotating, rotary output shaft 215 may rotate (step 504), rotary output shaft 215 being coupled to electric motor 214 and/or gearbox 216. In response, connecting output shaft 218 may rotate (step 506) from fixed locked position 224 away from upper brace 202 toward fixed unlocked position 226. Rotation by connecting output shaft 218 may cause connection pin 239 to translate within joint void 232 (step 508) from first end 233 to second end 234 of joint void 232. During the translation of connection pin 239 from first end 233 to second end 234 of joint void 232, link rod 220 may not translate longitudinally, i.e., substantially parallel to longitudinal axis 265. That is, connecting output shaft 218 may rotate independently of link rod 220. In response to connection pin 239 reaching second end 234 of joint void 232, the rotation of connecting output shaft 218 may cause link rod 220 to translate in first longitudinal direction 266 (step 510). In response, link rod 220 may cause upper lock link 206 and lower lock link 208 to move in first longitudinal direction 266, which may unlock locking linkage system 200.

In various embodiments, subsequent to unlocking locking linkage system 200, the output shaft position sensor 241 may detect that connecting output shaft 218 has reached fixed unlocked position 226 (step 512). In response, as described herein, electric motor 214 may be shut off so connecting output shaft 218 maintains fixed unlocked position 226 due to reflected inertia, and/or electric motor 214 may be commanded to actively maintain connecting output shaft 218 in fixed unlocked position 226. In various embodiments, joint position sensor 243 may detect a position of connection pin 239 within joint void 232 (step 514) in response to connecting output shaft 218 reaching fixed unlocked position 226. Joint position sensor 243 may detect a floating position 228 of connection pin 239 within joint void 232, and/or cause connection pin 239 to be disposed in floating position 228. Floating position 228 may be a position of connection pin 239 within joint void 232 in which connection pin 239 is free from contact with first end 233 and second end 234 of joint void 232. That is, in floating position 228, connection pin 239 may be physically separated from both first end 233 and second end 234 of joint void 232. In various embodiments, connection pin 239 may be in floating position 228 in response to connecting output shaft 218 being in fixed unlocked position 226 and/or lock links 206, 208 being in unlocked link position 209.

In various embodiments, once locking linkage system 200 has been positively unlocked, i.e., connecting output shaft is in an intermediate unlocked position or fixed unlocked position 226, link rod 220 is not needed to provide a continued force on lock links 206, 208, and a retract mechanism continues to fold locking linkage system 200 during a landing gear retraction (lower brace 204 moves in direction 253 relative to upper brace 202). From this point and through the rest of the motion that locking linkage system 200 articulates during retraction, link rod 220 and the other components of the downlock actuator 212 are positioned as to not hinder the retraction of the landing gear. To this end, during such landing gear retraction, with connecting output shaft 218 in fixed unlocked position 226 and connection pin 239 in floating position 228, lock links 206, 208 go through their defined motion, which is, in turn, realized as longitudinal motion substantially parallel to longitudinal axis 265 of link rod 220. Lost-motion joint 230 coupled to proximal end 222 of link rod 220 may allow link rod 220 to longitudinally move, in response to the defined motion of lock links 206, 208, without applying a load to connecting output shaft 218. Therefore, lost-motion joint 230 may be designed such that joint void 232 allows longitudinal translation, in both first longitudinal direction 266 and second longitudinal direction 267, of link rod 220 in response to the defined motion of lock links 206, 208 during landing gear retraction without connection pin 239, which may be stationary in fixed unlocked position 226, contacting first end 233 or second end 234 of joint void 232. That way, connecting output shaft 218 will not be disturbed from fixed unlocked position 226. For this reason, in various embodiments, electric motor 214 and/or gearbox 216 may not comprise a clutch. Therefore, gearbox 216 may be fixedly coupled to electric motor 214 and connecting output shaft 218 may be fixedly coupled to rotary output shaft 215. Lock links 206, 208 may continue their motion until they reach unlocked link position 209, and link position sensor 245 may detect the same.

Figure 6:
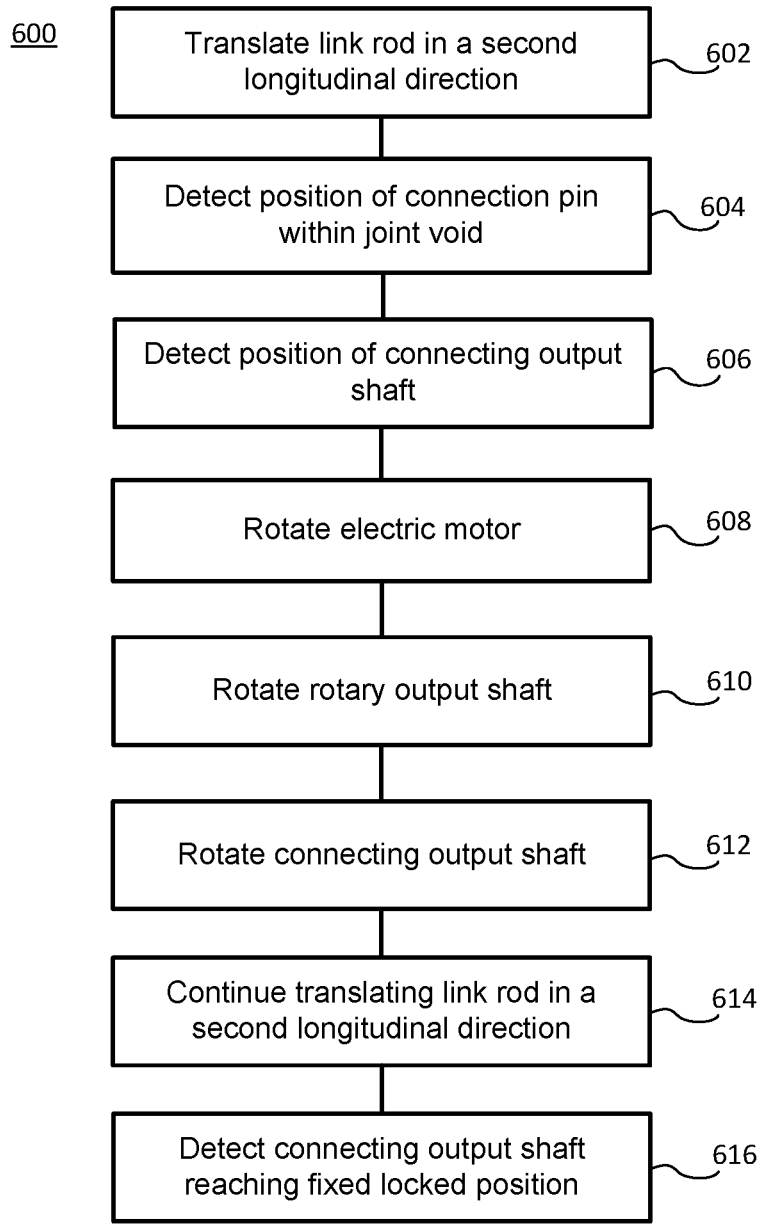
FIG. 6 illustrates a method for locking a locking linkage system, in accordance with various embodiments.

FIG. 6 depicts a method 600 for locking linkage system 200, in response to landing gear extension, in accordance with various embodiments. With combined reference to FIGS. 2A, 2B, 3A, 3B, 4, and 6, in operation, locking linkage system 200 may begin method 600 with connecting output shaft 218 in fixed unlocked position 226, connection pin in floating position 228, and upper lock link 206 and lower lock link 208 being in unlocked link position 209. In various embodiments, the landing gear extension process may begin with the retract actuator being powered to extend the landing gear. Lower brace 204 moves relative to upper brace 202 in a direction opposite direction 253, which may cause longitudinal translation of link rod 220 and lost-motion joint 230 relative to connection pin 239. Lost-motion joint 230 prevents such translation from applying a load to connecting output shaft 218. Link rod 220 may then translate in second longitudinal direction 267 (step 602). In response, lost-motion joint 230 translates in second longitudinal direction 267 relative to connection pin 239, which is stationary in fixed unlocked position 226.

Figure 4:
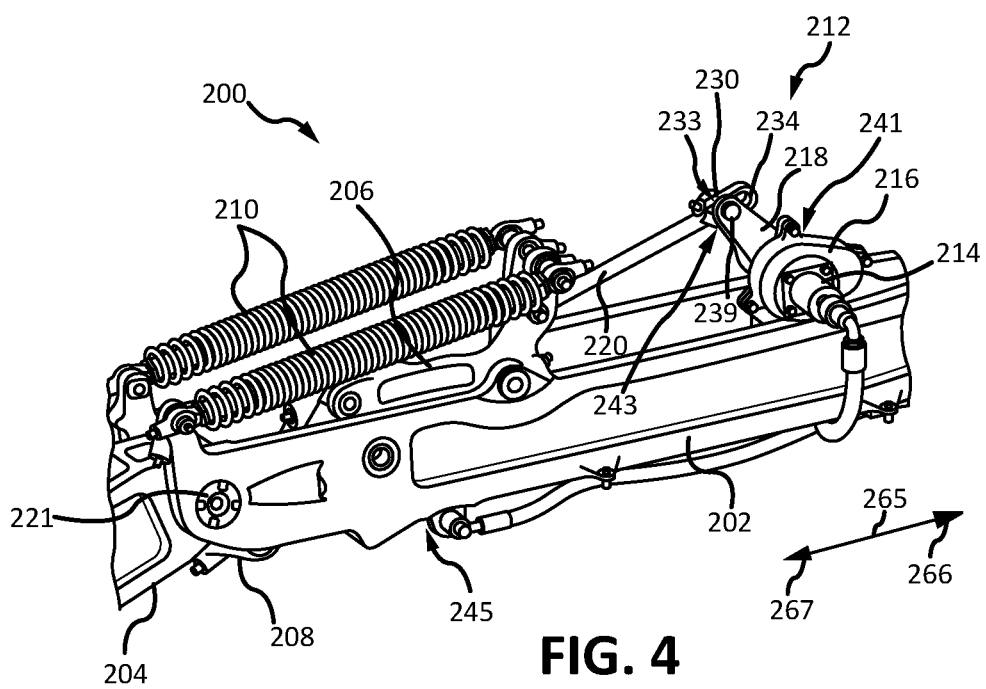
FIG. 4 illustrates a perspective view of a downlock actuator in another intermediate unlocked position.

In various embodiments, in response to connection pin 239 nearly reaching, or reaching, second end 234 of joint void 232 (the position of connection pin 239 in joint void 232 in FIG. 2B resembles such a position), joint position sensor 243 may detect the position of connection pin 239 within joint void 232 (step 604) as contacting second end 234 of joint void 232. In response, electric motor 214 may rotate (step 608) by being powered to do so. In various embodiments, in response to connection pin 239 reaching second end 234 of joint void 232, a load from lost-motion joint 230 may be applied to connecting output shaft 218 in second longitudinal direction 267. In response, connecting output shaft 218 may reach a triggering position, and that position of connecting output shaft 218 may be detected (step 606) by output shaft position sensor 241, and in response, electric motor 214 may rotate (step 608) by being powered to do so. The triggering position may be the same position or nearly the same position as fixed unlocked position 226. In various embodiments, steps 604 and 606 may be performed in the alternative or in conjunction with one another. Rotary output shaft 215 may rotate (step 610) in response to the rotation of electric motor 214, causing connecting output shaft 218 to rotate (step 612) toward upper brace 202. In response, connection pin 239 may translate along joint void 232, not yet applying a load to link rod 220. During step 610, upper brace 202 and lower brace 204 may continue to extend, and thus link rod 220 may continue to translate in second longitudinal direction 267. Connection pin 239 of link rod 220 may reach first end 233 of joint void 232 from the rotation of connecting output shaft 218 and apply a load to link rod 220, as shown in FIG. 4. In response, the rotation of connecting output shaft 218 may continue to translate link rod 220 in second longitudinal direction 267 (step 614). Connecting output shaft 218 may continue applying a load on link rod 220 in second longitudinal direction 267 until connecting output shaft reaches fixed locked position 224. Output shaft position sensor 241 may detect that connecting output shaft 218 reached fixed locked position 224 (step 616), at which point, connection pin may be in resting locked position 227 against first end 233, and lock links 206, 208 may be in locked link position 207. Link position sensor 245 may detect the same. In response, electric motor 214 may be shut off or commanded to maintain connecting output shaft 218 in fixed locked position 224.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A locking linkage system of a landing gear system, the locking linkage system comprising:
   a lockable assembly comprising:
      an upper brace defining a longitudinal axis;
      a lower brace coupled to the upper brace; and
      a linkage coupled to the upper brace and the lower brace, the linkage being configured to allow movement of the upper brace and the lower brace relative to one another between unlocked and locked positions; and
   a downlock actuator comprising:
      an electric motor coupled to the upper brace;
      a rotary output shaft coupled to the electric motor;
      a connecting output shaft having a first shaft end and a second shaft end, the first shaft end being coupled to the rotary output shaft, wherein the connecting output shaft is configured to rotate between a fixed locked position and a fixed unlocked position; and
      a link rod having a distal end coupled to the linkage and a proximal end comprising a lost-motion joint, the lost-motion joint being coupled to a connection pin of the second shaft end of the connecting output shaft,
      wherein the downlock actuator is configured to toggle the linkage, the upper brace, and the lower brace between an unlocked position and a locked position,
      wherein the lost-motion joint comprises a joint void defined by a void rim, wherein the connection pin is disposed within the joint void, wherein the joint void has a void length that is longer than a pin thickness of the connection pin such that the connection pin may translate within the joint void and the connection pin may only contact one of a first end and a second end of the joint void at a time, and
      wherein the connection pin is in a floating position in the joint void in response to the connecting output shaft being in the fixed unlocked position, the floating position being a pin position in which the connection pin is physically separated from the first end and the second end of the joint void.

2. The locking linkage system of claim 1, wherein the connection pin is in contact with the first end of the joint void in response to the connecting output shaft being in the fixed locked position.

3. The locking linkage system of claim 1, wherein the linkage comprises an upper lock link pivotally coupled to a lower lock link, wherein the upper lock link is coupled to the upper brace and the lower lock link is coupled to the lower brace.

4. The locking linkage system of claim 1, further comprising an output shaft position sensor proximate the connecting output shaft, wherein the output shaft position sensor is configured to detect a shaft position of the connecting output shaft.

5. The locking linkage system of claim 1, further comprising a joint position sensor, proximate the lost-motion joint, configured to detect a pin position of the connection pin along the void length.

6. The locking linkage system of claim 1, further comprising a gearbox to provide a desired amount of speed change between the electric motor and the connecting output shaft, wherein the gearbox is fixedly coupled to the electric motor, the rotary output shaft is fixedly coupled to the gearbox, and the connecting output shaft is fixedly coupled to the rotary output shaft.

7. A downlock actuator for a landing gear system, the downlock actuator comprising:
   an electric motor;
   a rotary output shaft coupled to the electric motor;
   a connecting output shaft having a first shaft end and a second shaft end, the first shaft end being coupled to the rotary output shaft, wherein the connecting output shaft is configured to rotate between a fixed locked position and a fixed unlocked position; and
   a link rod having a proximal end comprising a lost-motion joint, the lost-motion joint being coupled to a connection pin of the second shaft end of the connecting output shaft
   wherein the lost-motion joint comprises a joint void defined by a void rim, wherein the joint void has a void length that is longer than a pin thickness of the connection pin such that the connection pin may translate within the joint void and the connection pin may only contact one of a first end and a second end of the joint void at a time, and
   wherein the connection pin is in a floating position in the joint void in response to the connecting output shaft being in the fixed unlocked position, the floating position being a pin position in which the connection pin is physically separated from the first end and the second end of the joint void.

8. The downlock actuator of claim 7, wherein the link rod further comprises a distal end coupled to a lockable assembly, which includes a linkage, an upper brace, and a lower brace, and wherein, the connecting output shaft and the link rod are configured to toggle the linkage, the upper brace, and the lower brace between an unlocked position and a locked position.

9. The downlock actuator of claim 7, further comprising an output shaft position sensor proximate to the connecting output shaft configured to detect a shaft position of the connecting output shaft.

10. The downlock actuator of claim 7, further comprising a joint position sensor, proximate the lost-motion joint, configured to detect a pin position of the connection pin along the void length.

11. The downlock actuator of claim 7, wherein the connection pin is in contact with the first end of the joint void in response to the connecting output shaft being in the fixed locked position.

12. A method of positioning an upper brace and a lower brace of an aircraft landing gear system in a desired relationship with one another, comprising:
   rotating an electric motor in a desired rotational direction;
   rotating a rotary output shaft coupled to the electric motor;
   rotating a connecting output shaft between a fixed locked position and a fixed unlocked position in response to the rotating the rotary output shaft, a first shaft end of the connecting output shaft being coupled to the rotary output shaft, wherein the rotating the connecting output shaft comprises:
translating a connection pin, coupled to the connecting output shaft, between a first end of a joint void in a lost-motion joint and a second end of the joint void, wherein the lost-motion joint is coupled to a proximal end of a link rod, wherein the connecting output shaft rotates independently of the link rod throughout the translating the connection pin between the first end and the second end of the joint void; and
translating the link rod in a first longitudinal direction in response to the connecting output shaft rotating toward the fixed unlocked position, wherein, in response to the connecting output shaft reaching the fixed unlocked position, the connection pin reaches a floating position in the joint void, the floating position being a pin position in which the connection pin is physically separated from the first end and the second end of the joint void.

13. The method of claim 12, further comprising translating the link rod in a second longitudinal direction in response to the connecting output shaft rotating toward the fixed locked position.

14. The method of claim 12, further comprising detecting a shaft position of the connecting output shaft with an output shaft position sensor located proximate the connecting output shaft.

15. The method of claim 14, wherein the rotating the connecting output shaft comprises at least one of rotating the connecting output shaft from the fixed locked position, and stopping at the fixed unlocked position in response to the output shaft position sensor detecting the connecting output shaft arriving at the fixed unlocked position, and rotating the connecting output shaft from the fixed unlocked position, and stopping at the fixed locked position in response to the output shaft position sensor detecting the connecting output shaft arriving at the fixed locked position.

* * * * *